3,340,899
TEMPERATURE COMPENSATED FLOW
CONTROL VALVE
Frank Welty and Raymond D. Welty, Youngstown, Ohio,
assignors to The Vendo Company, Kansas City, Mo.,
a corporation of Missouri
Filed Aug. 9, 1962, Ser. No. 215,872
5 Claims. (Cl. 138—43)

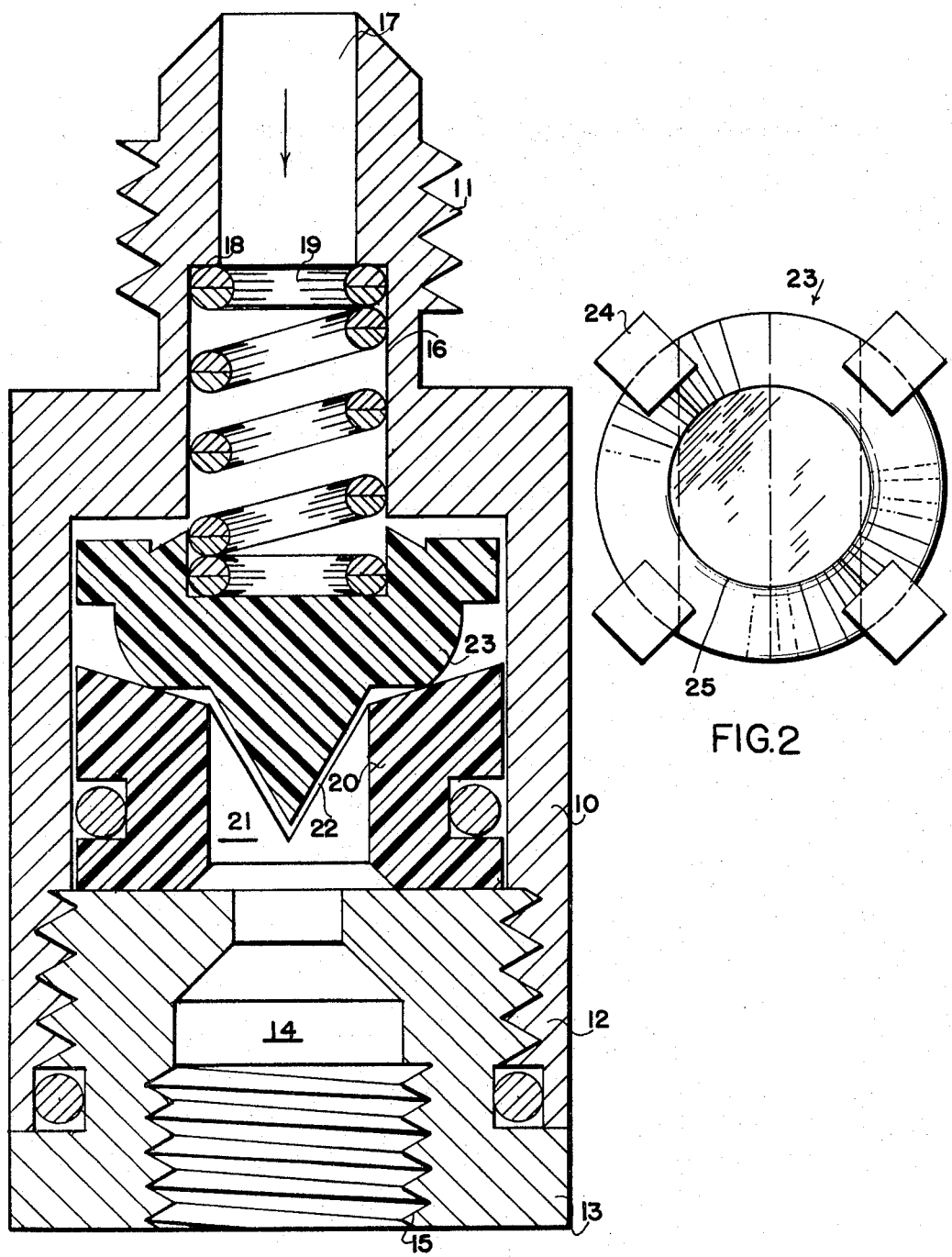

This invention relates to the art of controlling the flow of liquids in conduits in such manner that the rate of outflow will be substantially consistent regardless of variations in pressure of the liquid at its source. Such devices broadly are well known in the prior art and commonly take the form of a deformable button-like member which is positioned on the upstream side of an orificed seat having grooves for the passage of liquid against which surfaces of the button-like member are adapted to bear. As the upstream fluid pressure increases, the button-like member tends to deform and squash down thus decreasing the effective cross section of the grooves to thereby compensate for the increase pressure at the inlet ends of the grooves and establish a more or less uniform rate of outflow regardless of inlet pressure variations.

An important application for flow control valves of the general kind outlined above is in automatic mixing and dispensing apparatus for soft drinks wherein the valves are used to proportion the quantity of flavoring syrups in relation to the quantity of plain or carbonated water used. These flavoring syrups, however, are rich in dissolved sugars and thus are subject to wide variations in viscosity and specific gravity with temperature changes which cause erratic behavior of the presently known flow controlled devices in that an increase in specific gravity and consequent decrease in fluidity will materially reduce the flow though the input pressure remains the same. It is accordingly the primary object of this invention to provide a flow control device which is operative to deliver a syrupy fluid at a substantially constant rate regardless of variations in the pressure and temperature of the incoming fluid.

A further object of the invention is the provision of a temperature compensated liquid flow control valve which is exceedingly simple in design and construction and thus capable of being furnished at low cost and which may be readily adapted from devices now known and widely used.

The above and other objects and advantages of the invention will become apparent upon consideration of the following specification and the accompanying drawing wherein there is disclosed a preferred embodiment of the invention.

In the drawing:

FIG. 1 is a longitudinal section of a temperature-compensated flow control valve constructed in accordance with the principles of my invention; and FIGURE 2 is a top plan view of the deformable valve member used in the assembly of FIGURE 1.

In the illustrated embodiment of the invention the component parts are encased within a tubular fitting or thinmble 10 which is preferably machined from stainless steel and which has a threaded inlet shank 11 for connection to conventional tube fittings, not shown, and which has an internally threaded outlet end 12. Screw-threadedly received within this latter outlet end portion is a fitting 13 having a bore 14 therein which terminates in an outer threaded portion 15 which is adapted to be connected to other conventional tube fittings, also not shown.

The upper wall of the fitting 10 and a portion of its shank 11 is provided with a bore 16 of larger diameter than the inlet bore 17 of the shank 11. There is thus provided a shoulder 18, and snugly received within the bore 16 and abutting against the shoulder 18 is a helix 19 which is wound of bi-metallic wire—i.e. in which one half of the cross section of the wire is made of a metal having a low coefficient of expansion while the other half of the cross section of the wire is made of metal having a higher coefficient of expansion. Such wire, in various forms as to size and cross section, is readily available in the open market, being widely used in various temperature control apparatus. In the particular application illustrated herein the action of the helix made from such wire is to exert a higher axial expansive pressure upon increase of its temperature. This is made possible by snugly confining the helix in an axial bore (16) of substantial length. Normally, the diameter of the helix tends to increase with an increase in temperature of the metal of the helix but since this diameter increase is prevented by the snug fit of the helix in the bore the forces are translated, in an unknown manner, into an axial force tending to expand the helix axially.

Received centrally within the body portion of the fitting 10 is a disc 20 having a central bore 21 therein and having its upper surface formed with a deep transversely extending V-notch 22. The annular upper surface of the disc 20 slopes inwardly toward its center, as shown, and resting on this surface is the bottom peripheral edge of a button-like deformable valve member 23. Member 23, which is shown in both FIGURES 1 and 2, is generally circular in plan and has circumferentially spaced tabs 24 projecting radially outward of the general periphery of the member. Member 23 also has a transversely extending V-shaped projection on its bottom surface which is complementary to but spaced slightly inward of the surfaces of the V-notch 22 of the disc 20. Inasmuch as the transverse length of the V-shaped projection on the member 23 is somewhat shorter than the transverse length of the V-groove 22 it will be understood that liquids may enter the interstices between the surfaces of the V-notch and the V-shaped projection from the radially outward ends thereof. In practice, the upper surfaces of the member 23 are spaced downwardly from the top wall of the chamber in which parts 20 and 23 are housed to permit the inflow of fluid radially outward across the top of the member 23 and thence axially downward between the tabs 24 and thus to the entrances of the interstices above described.

In practice, the disc 20, which may be termed the orifice member, is made of sufficiently hard material to permit of little or no deflection during normal operation of the valve. The valve member 23, however, is relatively soft and deformable so that upon the application of increased pressure of its upper surfaces it will be deformed downwardly to reduce the cross-sectional areas of the interstices contiguous to the orifice surface provided by the V-notch 22. By selecting a material of suitable durometer value for the valve 23 in relation to the inlet pressure range with which the particular valve will be used it is possible to quite accurately control the rate of outflow of the valve regardless of variations of pressure at the inlet thereof. The aforesaid orifice interstices contract and expand in response to increase and decrease, respectively, of the pressure of the liquid at the inlet of the valve.

The above described principle of pressure compensation in valves of the general kind herein involved is satisfactory only when the liquid being handled has substantially the same specific gravity and viscosity over the entire range of temperature variations which may be encountered in the liquid being handled. In some applications as, for example, in the proportioning of flavoring syrups to carbonated water in the preparation of soft drinks in the field and immediately prior to consumption, the liquid to be handled is often subject to widely varying temperatures. In some installations the flavoring syrup may not be refrigerated at all while in others it may be initially cooled and then allowed to warm up to room temperatures particularly if the over-all dispensing time is prolongated. While these syrups, being rich in dissolved sugars, may be fairly light and thin when warmed they become rather heavy and viscose when chilled. Accordingly, the presently known pressure compensated flow control valves do not operate satisfactorily to meter the flow of such syrups under widely varying conditions of pressure and temperature. To obviate this difficulty we provide the bi-metallic helical spring installed as described above to act on the top surface of a deformable valve member 23 to increase the downward force exerted on this valve as the temperature of the liquid rises. To provide anchorage between the lower end of the helix 19 and the member 23 we provide a centrally disposed and circular depression 25 in the upper surface of the member 23 to snugly receive the lower end portion of the helix 19. It should be observed, also, that this arrangement is effective to accurately center the valve 23 with respect to the orifice disc 20 so that the parts are retained in accurate relative alignment for most efficient operation.

Inasmuch as the liquid which the valve of our invention is intended to handle may have a wide range of temperature difference we preferably so construct and dimension the parts that when the liquid temperature is in the lower part of the range the helix 19 exerts no force on the member 23, and under normal pressure of the liquid the flow-controlling orifice is of substantial cross-sectional area to permit an adequate flow of the cold syrup. If now the syrup should increase appreciably in temperature the helix 19 exands to exert a downward force on the member 23 in addition to the downward force exerted by the pressure of the syrup so that the higher fluidity of the syrup will be compensated for to yield the same rate of flow.

It should now to apparent that we have provided an improved flow control valve which accomplishes the objects initially set out above in that with a minimum of structural change and addition to presently known flow control valves we provide means to compensate not only for variations in inlet pressure but also for variations in the temperature of the entering liquid. For reasons heretofore stated, the valve of our invention is well suited for controlling the proportioning flow of flavoring syrups in soft drink mixing and dispensing installations. In representative measurements, we have found that some of these syrups may have a specific gravity of 29° Baumé at 60° F. whereas when this same syrup is cooled to below 40° F. it will then have a specific gravity of 40° to 45° Baumé with a consequent marked decrease in fluidity. Another important advantage of the use of our invention in soft drink mixing and dispensing apparatus, particularly, is that it minimizes the tendency of fruit pulp particles to clog the fine passages in the flow-control valve. Many of the flavoring syrups contain appreciable quantities of small particles of fruit pulp which when contained in cool syrupy fluids have a tendency to clog in the small orifices of the control value. By making the passages large at low temperatures these particles readily pass through the valve. When the syrup is at higher temperatures and less viscose the passages contract to keep the rate of flow constant.

The above specifically described embodiment of our invention should be considered as illustrative only since many changes may be made therein without departing from the spirit or scope of our invention. For example, we contemplate that the deformable valve 23 may be made of suitable plastic or rubber material which increases in durometer hardness as its temperature drops so that thereby when the liquid being translated is cool the pressure of the liquid will have less effect on the control member or valve and the regulating orifice will remain widely open. As the liquid increases in temperature the control member would become softer, more easily deformed and thus restrict the orifice passages to thereby compensate for the increase in fluidity of the liquid. Reference should therefore be had to the appended claims in determining the scope of the invention.

We claim:

1. A temperature compensated liquid flow control valve comprising a body member having a passage for liquid therethrough, an orificed barrier in said passage, a resilient deformable member seated on the upstream side of said barrier and forming with the orifice opening in said barrier means to control the flow of liquid through said passage, means to exert a yielding pressure on said deformable member in a direction tending to seat the deformable member on said barrier, the arrangement being such that upon an increased fluid pressure acting on the upstream side of said deformable member said orifice opening is decreased in effective cross-sectional area, and said means to exert a yielding pressure being temperature responsive whereby the presure is reduced upon a decrease in temperature of the liquid impinging on the upstream side of said deformable member.

2. A valve according to claim 1 further characterized in that said means to exert a yielding pressure comprises a bi-metallic helical spring havin one end abutted against a surface of said body member and its other end seated on said deformable member.

3. A valve according to claim 1 further characterized in that said member is formed of polyethylene.

4. A temperature compensated liquid flow control valve comprising a body member having an opening therethrough and a shank portion of reduced diameter at one end thereof, said shank portion forming the inlet portion of said valve, a bore in said shank portion opening into said body member and terminating at its other end at an annular shoulder, a disc-like member received within said body member adjacent the outlet end thereof and having an orifice therein providing communication between the inlet and outlet ends of said body member, a deformable valve member seated on said disc-like member intermediate the latter and said shoulder end having portions overlying but spaced from said orifice, the arrangement being such that upon an increase in presure of the liquid entering said body member said valve member will be deformed to restrict the effective area of said orifice, and a helix wound from bi-metallic wire snugly received in said bore and abutting against said shoulder for engaging said deformable valve member to deform the same in a direction tending to decrease the effective area of said orifice upon an increase in temperature of the entering liquid, said deformable valve member being provided with a circular recess formed on the surface facing said shoulder, and an end portion of said helix being snugly received in said recess.

5. Apparatus according to claim 4 further characterized in that said deformable valve member is provided with a circular recess formed on the surface facing said shoulder, and an end portion of said helix being snugly received in said recess.

(References on following page)

References Cited

UNITED STATES PATENTS

| | | | |
|---|---|---|---|
| 1,813,122 | 7/1931 | Moore | 137—468 X |
| 2,592,380 | 4/1952 | Beckett | 137—480 X |
| 3,082,789 | 3/1963 | Welty | 138—43 X |
| 3,137,476 | 6/1964 | Rotheraine | 251—368 X |
| 3,189,125 | 6/1965 | Windsor | 138—43 |

FOREIGN PATENTS 1,156,180   5/1958   France.

WILLIAM F. O'DEA, *Primary Examiner.*

ISADOR WEIL, *Examiner.*

D. A. ROWE, H. W. WEAKLEY, *Assistant Examiners.*